(12) United States Patent
Lin et al.

(10) Patent No.: US 10,579,107 B2
(45) Date of Patent: Mar. 3, 2020

(54) REVERSIBLE CONNECTOR ORIENTATION DETECTION CIRCUITRY

(71) Applicant: Microsoft Technology Licensing, LLC, Redmond, WA (US)

(72) Inventors: James Hao-An Chen Lin, Issaquah, WA (US); Jyhlin Chang, Shoreline, WA (US); Manish Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 15/466,158

(22) Filed: Mar. 22, 2017

(65) Prior Publication Data
US 2018/0275724 A1 Sep. 27, 2018

(51) Int. Cl.
*G06F 1/22* (2006.01)
*G06F 1/16* (2006.01)
*H01R 13/64* (2006.01)

(52) U.S. Cl.
CPC ............ *G06F 1/1677* (2013.01); *G06F 1/162* (2013.01); *G06F 1/1654* (2013.01);
(Continued)

(58) Field of Classification Search
CPC ...... G06F 1/162; G06F 1/1564; G06F 1/1662; G06F 1/1669; G06F 1/22; G06F 1/1677; G06F 1/1654; H01R 13/64
See application file for complete search history.

(56) References Cited

U.S. PATENT DOCUMENTS

| 5,233,502 A | 8/1993 | Beatty et al. |
| 6,183,307 B1 | 2/2001 | Laity et al. |

(Continued)

FOREIGN PATENT DOCUMENTS

| EP | 2590273 A2 | 5/2013 |
| EP | 2961008 A1 | 12/2015 |

(Continued)

OTHER PUBLICATIONS

"International Search Report and Written Opinion Issued in PCT Application No. PCT/US2018/022524", dated Oct. 11, 2018, 17 Pages.

(Continued)

*Primary Examiner* — Carolyn R Edwards
(74) *Attorney, Agent, or Firm* — Alleman Hall Creasman & Tuttle LLP

(57) ABSTRACT

Reversible connector orientation detection circuitry, reversibly connectible devices having multiple device portions, and methods for determining a connection orientation of multiple device portions of a hardware device are provided herein. A hardware device can include a first device portion and a second device portion. A first resistor can be in a first side of the first device portion. A second resistor can be in a first side of the second device portion, and a third resistor can be in a second side of the second device portion. Connection of the first device portion to the second device portion in different orientations creates, through the resistors, different voltages that can be compared by a digital logic device to indicate orientation. The compared voltages are within either a low voltage range below a digital logic low threshold or a high voltage range above a digital logic high threshold.

20 Claims, 8 Drawing Sheets

(52) U.S. Cl.
CPC .......... G06F 1/1662 (2013.01); G06F 1/1669 (2013.01); G06F 1/22 (2013.01); *H01R 13/64* (2013.01)

(56) References Cited

U.S. PATENT DOCUMENTS

| | | | |
|---|---|---|---|
| 2003/0112590 A1 | 6/2003 | Shinano et al. | |
| 2004/0114315 A1* | 6/2004 | Anlauff | G06F 1/162 361/679.28 |
| 2006/0174687 A1* | 8/2006 | Autor | G01C 17/00 73/1.77 |
| 2007/0188450 A1* | 8/2007 | Hernandez | G06F 1/1626 345/158 |
| 2008/0018306 A1* | 1/2008 | Shin | G01R 15/04 320/149 |
| 2009/0231791 A1 | 9/2009 | Aoyama et al. | |
| 2009/0303063 A1* | 12/2009 | Su | G01R 19/0084 340/660 |
| 2009/0303205 A1* | 12/2009 | Seibert | G06F 1/1616 345/204 |
| 2010/0007603 A1* | 1/2010 | Kirkup | G06F 1/1616 345/158 |
| 2010/0321275 A1 | 12/2010 | Hinckley et al. | |
| 2011/0022350 A1* | 1/2011 | Chatterjee | G06F 3/0346 702/150 |
| 2014/0281444 A1* | 9/2014 | Waltermann | G06F 9/4401 713/1 |
| 2015/0015525 A1* | 1/2015 | Cho | G06F 3/0412 345/173 |
| 2015/0113179 A1* | 4/2015 | Chen | G06F 11/3051 710/16 |
| 2015/0175027 A1* | 6/2015 | Garcia-Flores | B60L 11/1851 324/426 |
| 2015/0261714 A1 | 9/2015 | Talmola | |
| 2015/0372429 A1* | 12/2015 | Lee | H01R 13/665 439/218 |
| 2016/0048363 A1 | 2/2016 | North et al. | |
| 2016/0217092 A1* | 7/2016 | Huang | G06F 13/10 |
| 2016/0335219 A1* | 11/2016 | Chang | G06F 13/4068 |

FOREIGN PATENT DOCUMENTS

| | | |
|---|---|---|
| EP | 3113298 A1 | 1/2017 |
| WO | 2015079215 A1 | 6/2015 |

OTHER PUBLICATIONS

Gomes, et al., "PaperFold: Evaluating Shape Changes for Viewport Transformations in Foldable Thin-Film Display Devices", In Proceedings of the Ninth International Conference on Tangible, Embedded, and Embodied Interaction, Jan. 15, 2015, pp. 153-160.

* cited by examiner

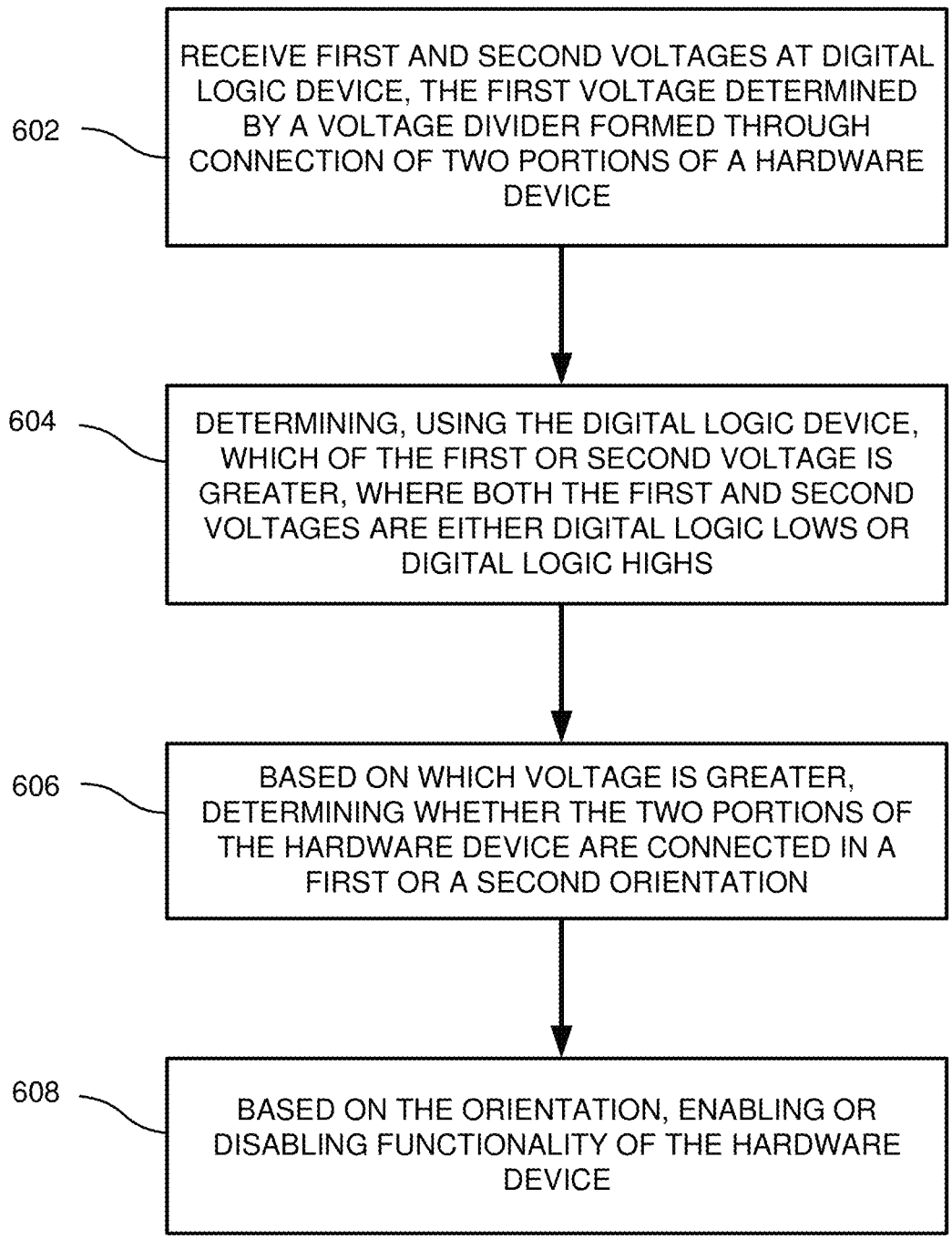

SOFTWARE 780 IMPLEMENTING DESCRIBED TECHNOLOGIES

REVERSIBLE CONNECTOR ORIENTATION DETECTION CIRCUITRY

BACKGROUND

As computing devices have become more powerful and device components have become smaller, full-function portable devices have become increasingly common. At the same time, microprocessors have also begun to be incorporated into many devices that previously lacked microprocessors as well as into multi-part devices. Determination of whether the different pieces of multi-part devices are connected, and in what orientation, however, remains challenging.

SUMMARY

Examples described herein relate to multi-part devices having reversible connection orientation detection circuitry. The circuitry provides an indication of the orientation in which different portions of a multi-part hardware device are connected. An example device can include a first device portion and a second device portion. The first device portion can be detachably and reversibly connectable to the second device portion. The example device can also include a first, second, and third resistor. The first resistor can be in a first side of the first device portion. The second resistor can be in a first side of the second device portion, and the third resistor can be in a second side of the second device portion. Connection of the first device portion to the second device portion in a first orientation forms a first voltage divider between the first resistor and the second resistor. Connection of the first device portion to the second device portion in a second orientation forms a second voltage divider between the first resistor and the third resistor.

The example device can also include a digital logic device that can be configured to receive a voltage representing the output of either the first or second voltage divider and compare the voltage to a second voltage. The result of the comparison indicates whether the device is connected in the first orientation or the second orientation. Both the output of the first or second voltage divider and the second voltage are within either a low voltage range below a digital logic low threshold or a high voltage range above a digital logic high threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

BRIEF DESCRIPTION OF THE DRAWINGS

FIG. 6 illustrates an example method of detecting the orientation in which the portions of a multi-part device are connected and managing device functionality.

DETAILED DESCRIPTION

Using the systems, methods, and computer-readable media described herein, a multi-part hardware device can determine the orientation in which the portions of the device are connected. Depending upon the orientation of the device portions, different functionality can be enabled or disabled. As an example, consider a two-part laptop computer having a base portion with a keyboard and a detachable display portion. If the display is connected to the base in a forward orientation with the display facing the keyboard (as with a traditional laptop), the keyboard, communication ports, or other functionality can be enabled for use as a traditional laptop. If, however, the display is connected to the base in a reverse orientation, with the display facing away from the keyboard such that the base portion effectively serves as a display stand, the keyboard, communication ports or other functionality can be disabled to avoid inadvertent key strokes or other input.

The technology described herein allows detection of the connection orientation through a reliable, hardware-based approach. Resistors are connected to some of the pins of the connector(s) through which the hardware portions connect, and when a connection is made, one or more voltage dividers are formed. For a given supply voltage, the output of a voltage divider depends on the values of the resistors that form the voltage divider. By connecting resistors to multiple pins, different voltages can be formed depending on the connection orientation, and the voltages can be used to determine the connection orientation. The output voltage(s) for the voltage divider(s) are within the digital logic low or digital logic high range (e.g., for 3.3 V logic, a low is less than ~1.2 V), allowing the orientation detection to be implemented using connector pins already designated for another function without interfering with the other function, saving valuable connector space. Examples are described below with reference to FIGS. 1-8.

Figure 1:
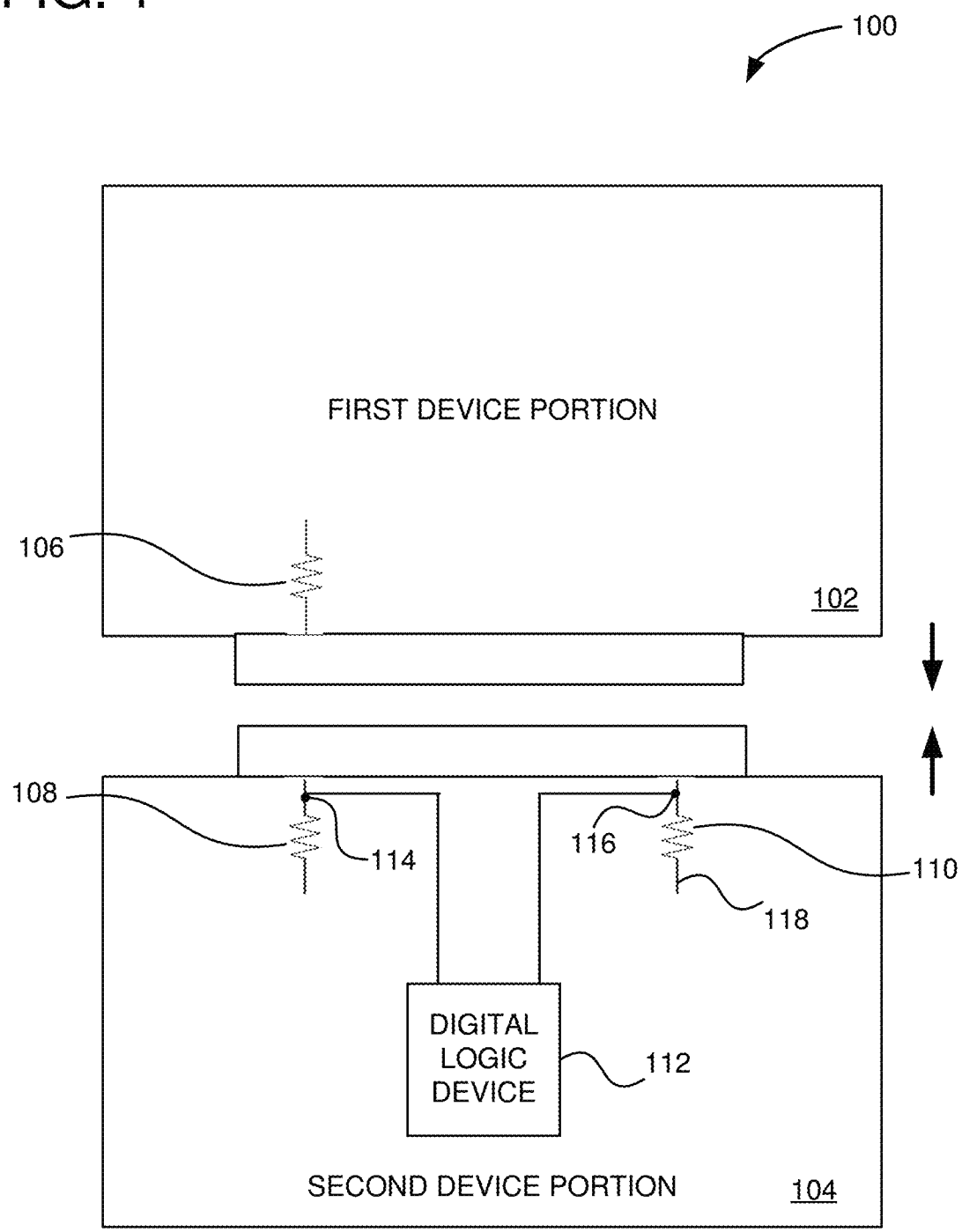
FIG. 1 is a block diagram of an example device having multiple device portions that are reversibly connectable, the example device including connection orientation detection circuitry.

FIG. 1 illustrates a device 100 comprising a first device portion 102 and a second device portion 104. First device portion 102 is detachably and reversibly connectable to second device portion 104. Device 100 can be, for example, a laptop computer with first device portion 102 being a display portion and second device portion 104 being a base portion having a keyboard. Device 100 can also be a battery charger, computer storage device, graphic processor unit, or other reversible host-accessory combination.

A first resistor 106 is in a first side of first device portion 102. A second resistor 108 is in a first side of second device portion 104, and a third resistor 110 is in a second side of second device portion 104. Connection of first device portion 102 to second device portion 104 in a first orientation forms a first voltage divider, the first voltage divider being between first resistor 106 and second resistor 108. Connection of first device portion 102 to second device portion 104 in a second orientation forms a second voltage divider, the second voltage divider being between first resistor 106 and third resistor 110. The second orientation can be, for example, a 180, 90, or other degree rotation.

A digital logic device 112 is configured to receive a voltage (the voltage at node 114 or node 116) representing the output of either the first or second voltage divider and compare the voltage to a second voltage. The result of the comparison indicates whether device 100 is connected in the first orientation or the second orientation. Both the output of the first or second voltage divider and the second voltage are within either a low voltage range below a digital logic low threshold or a high voltage range above a digital logic high threshold. Digital logic device 112 can be or comprise an analog-to-digital converter (ADC) and be configured to compare digital voltage levels converted, using the ADC, from the output of the first or second voltage divider and the second voltage. Digital logic device 112 can also comprise a comparator and/or one or more AND, NAND, OR, NOR, XOR, or other logic gates.

Device 100 can also comprise at least one processing device (not shown) in communication with digital logic device 112. The at least one processing device can be a processor, microcontroller, programmable logic device, or other processing device and is configured to enable or disable different functionality based on whether the comparison by digital logic device 112 indicates that device 100 is connected in the first orientation or the second orientation. The enabled or disabled functionality can include communication ports, keyboard or trackpad input, touch input, battery use, audio or video capabilities (including a subwoofer or other speakers that are only enabled in a specific orientation or a secondary display that is enabled or disabled in a specific orientation), internet connectivity, external charging capability, external docking capability, or other functionality. In some examples, both first device portion 102 and second device portion 104 comprise at least one processing device in communication with digital logic device 112. The processing devices are configured to enable or disable functionality of device 100 based on the result of the comparison by digital logic device 112. In some examples, digital logic device 112 is part of a processing device.

Figure 2:
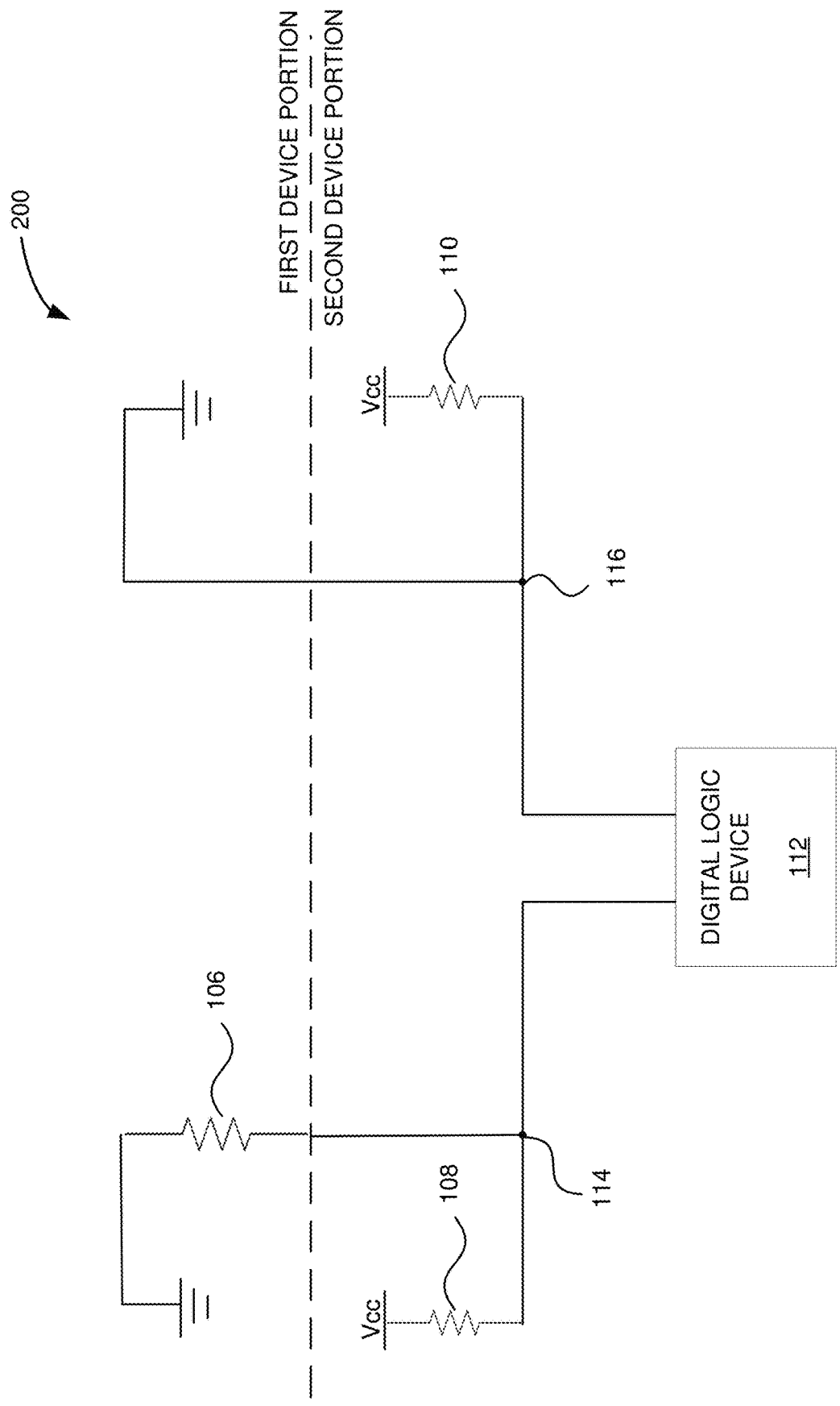
FIG. 2 is a circuit diagram illustrating an example connection orientation detection circuitry formed when two device portions of FIG. 1 are connected where the first and second voltage are both digital lows.

FIG. 2 is a circuit schematic 200 illustrating an example configuration including first resistor 106, second resistor 108, third resistor 110, and digital logic device 112 of FIG. 1. First resistor 106 is connected on one side to ground and, when the first and second device portions are connected in a first orientation, first resistor 106 is connected on the other side to second resistor 108. (In a second orientation, first resistor 106 is connected to third resistor 110). Second resistor 108 is connected on the other side to a positive supply voltage (hereinafter Vcc). The connection between second resistor 108 and first resistor 106 forms the voltage divider. The output voltage of the first voltage divider, at node 114, varies depending on the values selected for first resistor 106 and second resistor 108.

Similar to second resistor 108, third resistor 110 is also connected to Vcc on one end. Third resistor 110, however, is connected to ground on the other end (at node 116) when first device portion 102 is connected to second device portion 104 in the first orientation. Thus, the voltage at node 116 (the second voltage to which the output of the first voltage divider is compared) is zero, which is a digital low.

The values of second resistor 108 and first resistor 106 can be selected such that the output voltage of the first voltage divider, at node 114, is also a digital low but can still be differentiated from zero by digital logic device 112. For example, if second resistor 108 is 100 kΩ and first resistor 106 is 15 kΩ, then the output voltage at node 114 is 0.13 of Vcc, or for a 3.3 V logic system, 0.429 V. In 3.3 V logic, a digital low is typically considered to be less than ~1.2 V. This value is referred to as $V_{IL}$ and can vary depending on the logic devices being used. Digital logic systems similarly define a $V_{IH}$, which is the threshold voltage for being considered a digital logic high (~2.3 V for a 3.3 V system). Other logic voltages can also be used (e.g., 1.8 V, 5 V, etc.)

The example values of 100 kΩ and 15 kΩ are just one of a number of value pairs that could be chosen to create a given voltage. Any voltage level below $V_{IL}$ can be selected as the output of the first voltage divider, but larger differences between the voltage level and zero are more easily and accurately detected by digital logic device 112. The degree to which close voltages can be distinguished can also be affected by the type of digital logic device used. For example, if an ADC is used, more bits provide a greater ability to differentiate (e.g., a 12-bit ADC provides 4096 unique values over the system voltage range). Conversely, if the voltage level is too close to $V_{IL}$, the possibility of being erroneously interpreted as an indeterminate value instead of a digital logic low increases.

Figure 3:
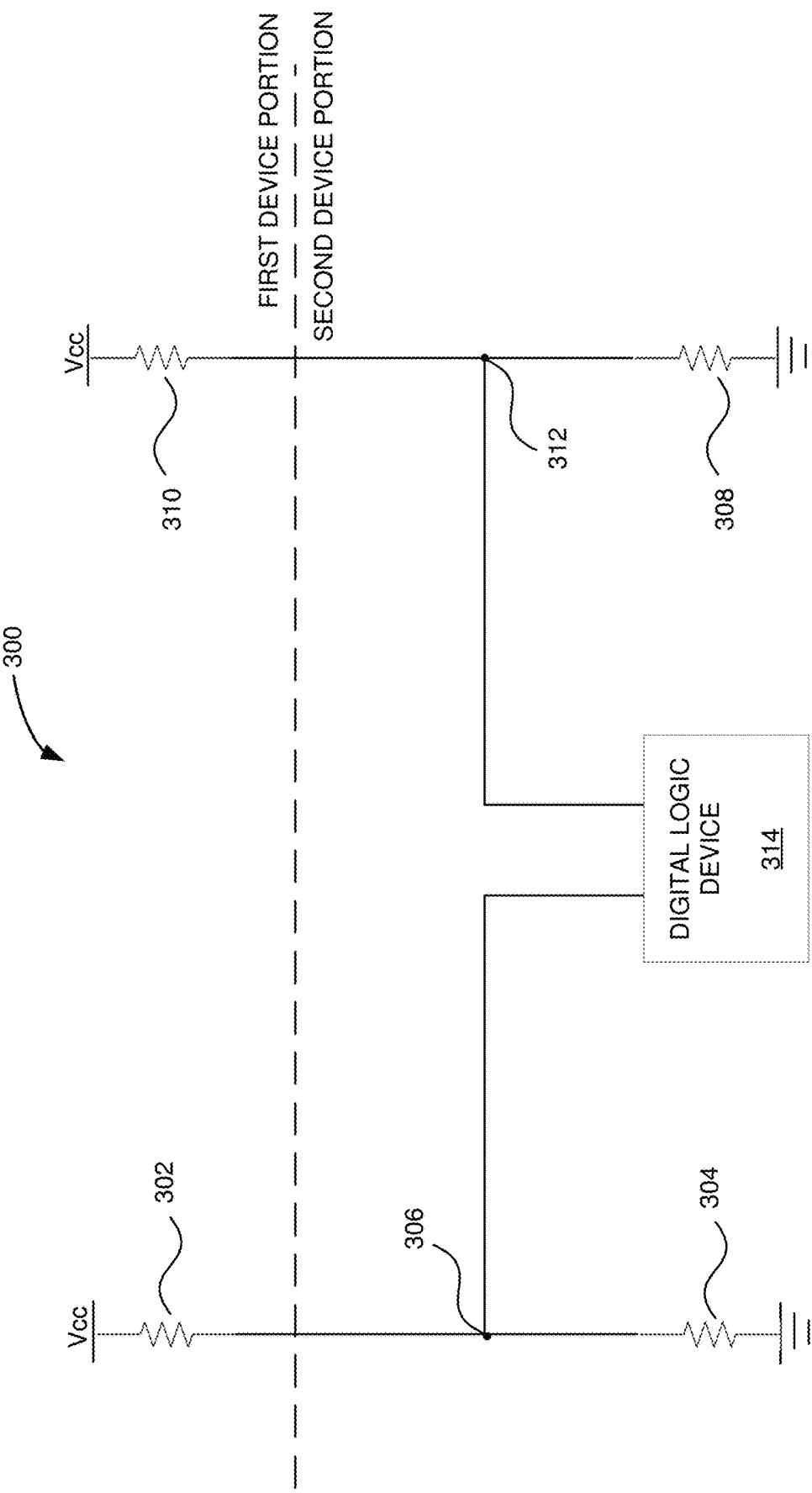
FIG. 3 is a circuit diagram illustrating an example connection orientation detection circuitry formed when two device portions are connected where the first and second voltage are both digital highs.

Although not shown in FIGS. 1 and 2, first device portion 102 and second device portion 104 can both comprise corresponding connector portions (e.g., male and female connector portions) having a plurality of pins. The connector portions are reversibly connectable (e.g., can be connected in a first orientation as well as connected in a second orientation by rotating one of the connector portions 180 degrees). First resistor 106, second resistor 108, and third resistor 110 can each be connected to pins of one of the connector portions, and connection of the pins of the different connector portions forms the circuit (e.g., the circuit shown in FIG. 2). Having both node 114 and node 116 be at a logic low level (or at a logic high level as shown in FIG. 3) allows the pins to which first resistor 106, second resistor 108, and third resistor 110 are connected to also be used for another, separate function without interfering with the orientation detection, allowing the pins (which are often scarce in connectors) to be used twice.

For example, the pins to which first resistor 106, second resistor 108, and third resistor 110 are connected can be used for detecting that first device portion 102 is connected to second device portion 104. Because the voltage at nodes 114 and 116 is high when first device portion is not connected (pulled up to Vcc), the high voltage indicates, to second device portion 102, that there is no connection. When first device portion 102 is connected, the voltages at nodes 114 and 116 will both be seen as low, indicating connection (while also being sufficiently different, 0.429 V vs. 0 V, to determine orientation).

Determining whether the device portions are connected (as opposed to the orientation in which they are connected) allows for enabling or disabling certain features of interest. For example, if a display portion having a small battery is connected to a base portion having a larger main battery, determining that device portions are connected allows the display portion to draw from the main battery in the base portion rather than the smaller battery in the display portion.

In some examples, rather than simply connecting to ground, a fourth resistor is included in a second side of the first device portion. For example, in FIG. 2, a fourth resistor can be included between node 116 and ground similar to the connection of first resistor 106. In such examples, the second voltage is also the result of a voltage divider (between the fourth resistor and third resistor 110). Values for the resistors can be selected such that the voltages at nodes 114 and 116 are distinguishable by digital logic device 112 but are still both digital logic lows. An example with four resistors (using digital logic high values) is illustrated in FIG. 3. In some examples, a zero ohm resistor can be used. A zero ohm resistor is effectively equivalent to a short circuit but can act as a placeholder—the space used on a circuit board implementing the circuit is taken by the zero ohm resistor, and the circuit design can be updated at a later time to include a non-zero resistor.

In some examples, second resistor 108 and third resistor 110 are a same value (e.g., 100 kΩ) or similar value (e.g., 80 kΩ and 100 kΩ) such that depending on the connection orientation, first resistor 106 will either be connected to second resistor 108 or third resistor 110, and the corresponding node (node 114 or 116) will have the higher voltage while the other node will be zero. Whether node 114 or node 116 is the node with the higher value then indicates the orientation.

FIGS. 1 and 2 illustrate a voltage divider between two resistors. It is understood that multiple resistors or other components in series or parallel can be used to achieve a given resistance. As such "first resistor 106," for example, can refer to a group of circuit components that have the desired effective resistance. Multiple additional circuit elements (capacitors, switches, gates, transistors, integrated circuits, etc.) can also be included but have been omitted in FIG. 2 for simplicity.

FIG. 3 illustrates a circuit schematic 300 similar to that shown in FIG. 2 but in which four resistors are used and in which the voltage range above $V_{IH}$ (rather than below $V_{IL}$) is used for connection orientation detection. First resistor 302 is in a first side of a first device portion. Second resistor 304 is in a first side of a second device portion. When the first and second device portions are connected in a first orientation, first resistor 302 is connected to second resistor 304 at node 306, and a first voltage divider is formed with an output voltage at node 306. By using a higher value for second resistor 304 than for first resistor 302 (e.g., 100 kΩ vs. 15 kΩ), node 306 will have a digital logic high voltage of approximately 2.87 V for a 3.3 V Vcc.

Third resistor 308 is in a second side of the second device portion and is connected to ground similar to second resistor 304. When the first device portion and the second device portion are connected in the first orientation, fourth resistor 310, which is connected to Vcc similar to first resistor 302, is connected to third resistor 308 at node 312. By using a higher value for third resistor 308 relative to fourth resistor 310 (e.g., 100 kΩ vs. 5 kΩ), node 312 will have a digital logic high voltage (3.14 V for the 100 kΩ/5 kΩ example) while still being distinguishable by a digital logic device 314 (2.87 V vs. 3.14 V). Having both voltages being compared by digital logic device 314 being digital logic highs allows multiple uses of connector pins for a different purpose in which highs are expected when the device portions are connected. When the first and second device portions are disconnected, nodes 306 and 312 will be 0 V (and thus a digital logic low).

If the first and second device portions are connected in a second orientation (e.g., a reverse orientation), then the voltage dividers will be formed between first resistor 302 and third resistor 308 and fourth resistor 310 and second resistor 304, and the node of nodes 306 and 312 that has the larger voltage level will switch, indicating the second orientation.

Figure 4:
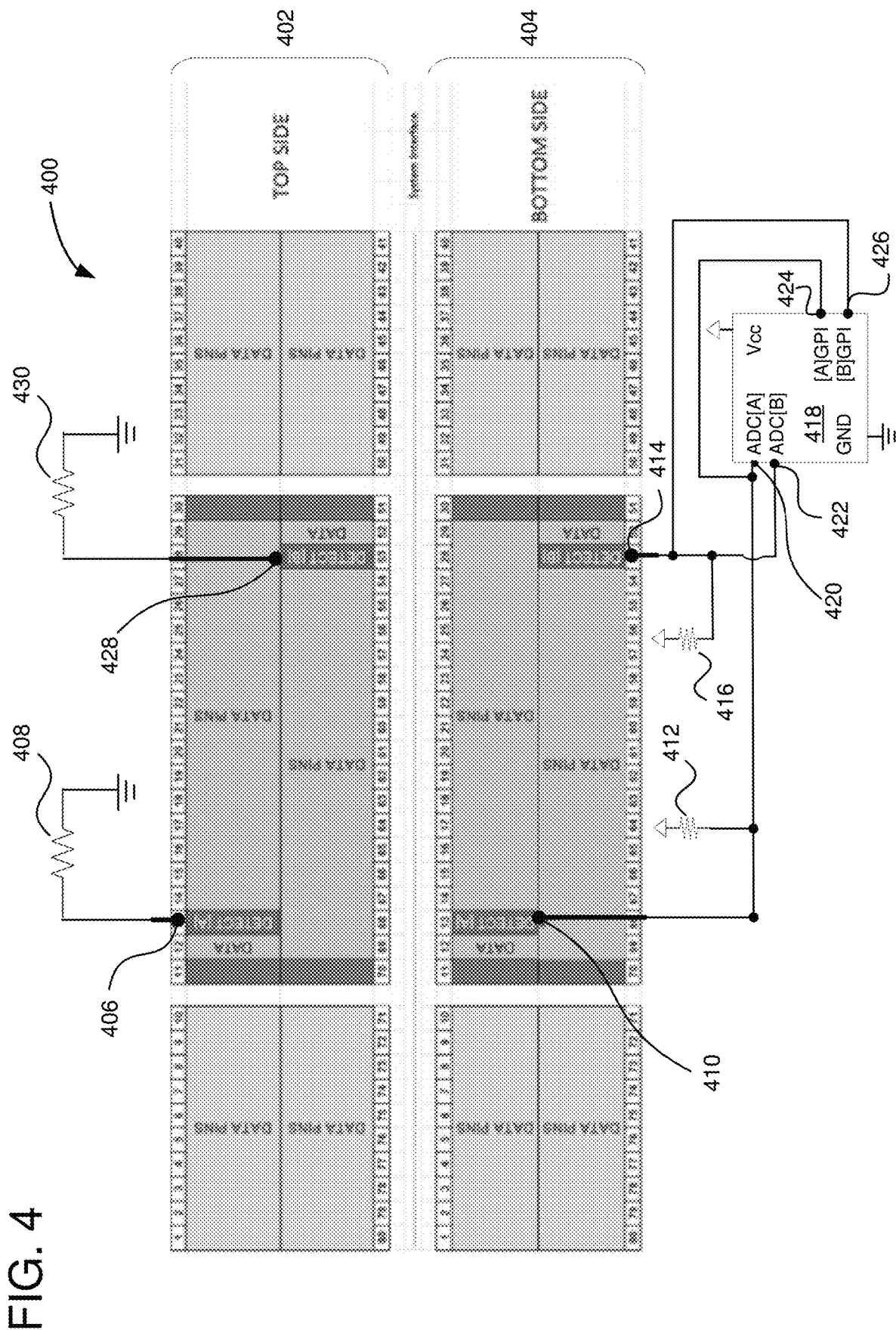
FIG. 4 is a diagram illustrating a pinout of an example reversible connector and connections of the example reversible connector with example connection orientation detection circuitry.

FIG. 4 is a schematic 400 illustrating an example reversible connector having a first connector portion 402 (labeled "top side") and a second connector portion 404 (labeled "bottom side"). First connector portion 402 and second connector portion 404 have pins on both sides (numbered 1-80 on the respective connector portions) and are reversibly connectible. First connector portion 402 is connected at node 406 (pin 13, "DETECT [A]") to a first resistor 408. Second connector portion 404 is connected at node 410 (pin 13, "DETECT [A]") to a second resistor 412.

Second connector portion 404 is also connected, at node 414 (pin 53, "DETECT [B]"), to a third resistor 416. Similar to second resistor 108 and third resistor 110 of FIGS. 1 and 2, second resistor 412 and third resistor 416 are also connected to Vcc. As a result, when first connector portion 402 and second connector portion 404 are disconnected, the voltages at nodes 410 and 414 are pulled high, and a high input is received at digital logic device 418 at inputs 420 ("ADC[A]"), 422 ("ADC[B]"), 424 ("[A]GPI"), and 426 ("[B]GPI"). Digital logic device 418 can be, for example, a microcontroller or other device having ADC inputs, general purpose inputs (GPI), as well as other inputs.

First connector portion 402 is also connected, at node 428 (pin 53, "DETECT [B]"), to a fourth resistor 430. Fourth resistor 430 can also be replaced by a short circuit to ground or a zero ohm resistor. First resistor 408 and fourth resistor 430 are also connected to ground. When first connector portion 402 and second connector portion 404 are connected in a first orientation, node 406 is connected to node 410, creating a first voltage divider between second resistor 412 and first resistor 408, and node 428 is connected to node 414, creating a second voltage divider between third resistor 416 and fourth resistor 430. In examples where fourth resistor 430 is a zero ohm resistor, it can still be considered a voltage divider, with all of the voltage drop occurring across third resistor 416.

By selecting values for second resistor 412 and third resistor 416 larger enough than values for first resistor 408 and fourth resistor 430, the first and second voltage dividers produce output voltages that are both within the digital logic low range but can still be distinguished. For example, if second resistor 412 and third resistor 416 are 100 kΩ and first resistor 408 and fourth resistor 430 are 15 kΩ and 5 kΩ (or 0), respectively, then orientation can be determined by comparing the voltage divider output voltages at inputs 420 and 422 (ADC inputs) of digital logic device 418. Because the outputs of the two voltage dividers are both considered a digital logic low, these voltages can also be provided to inputs 424 and 426 for the purpose of determining that first connector portion 402 and second connector portion 404 are connected at both nodes 406/410 and nodes 428/414.

Thus, by taking advantage of the voltage range below the $V_{IL}$ level, the "DETECT [A]" and "DETECT [B]" pins (nodes 406/410 and 428/414) are used for two purposes. The circuit connections and resistor values in FIG. 4 can also be modified to use the voltage range above the $V_{IH}$ level to achieve multiple purposes for the same pins (as discussed, for example, with respect to FIG. 3).

Figure 5A:
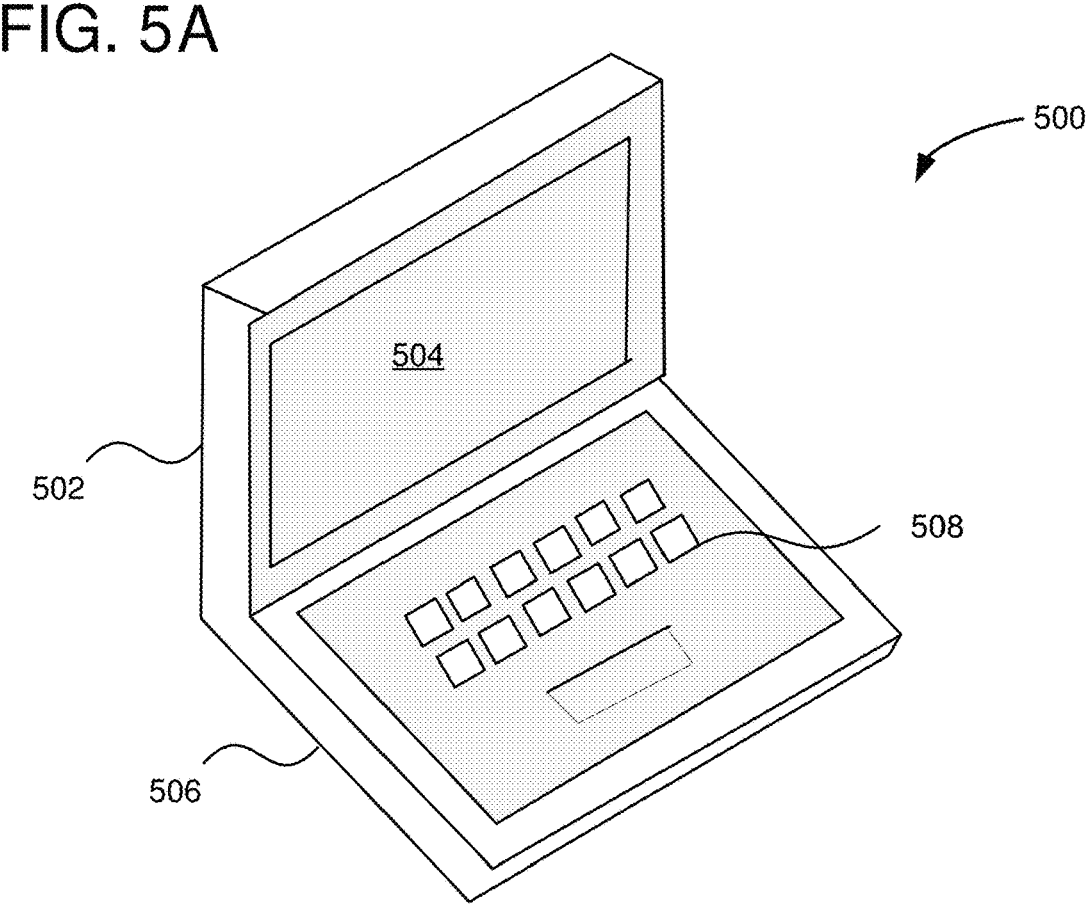
FIGS. 5A and 5B are simplified perspective views of a computing device with two portions connected in different orientations.
Figure 5B:
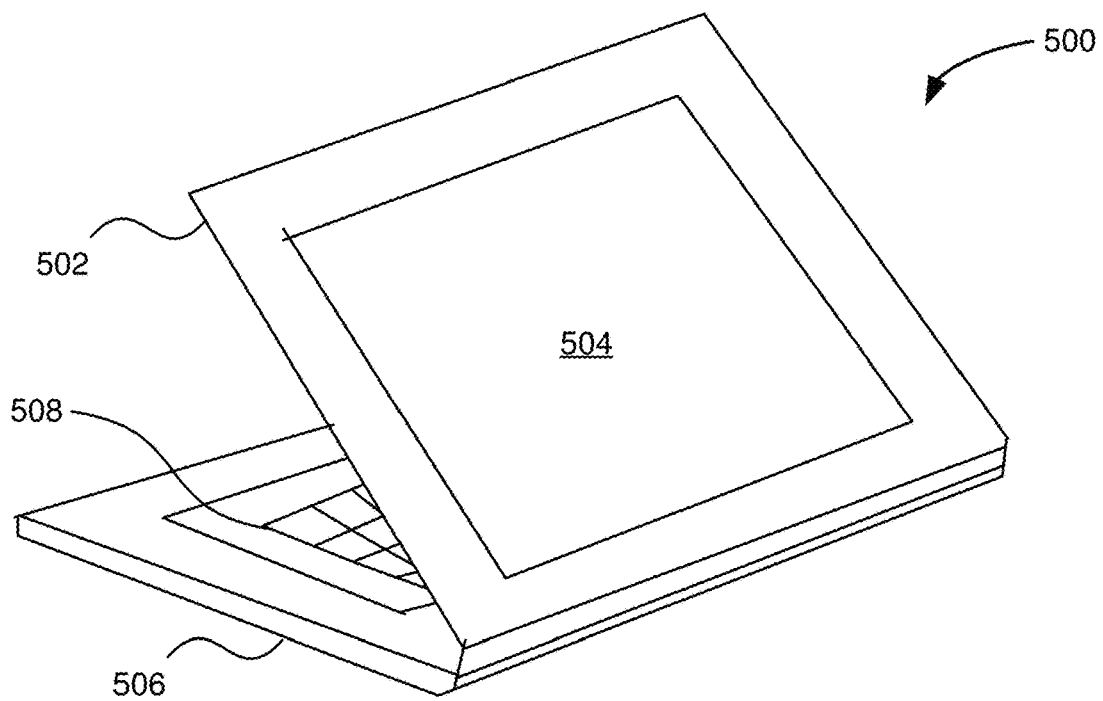

FIGS. 5A and 5B illustrate a device 500 comprising a first device portion 502 having a display 504 and a second device portion 506 having a keyboard 508. First device portion 502 is detachably and reversibly connectible to second device portion 506 through a reversible connector (e.g., as shown in FIG. 4). FIG. 5A shows first device portion 502 connected in a first orientation with display 504 facing keyboard 508 like a traditional laptop computer. FIG. 5B shows first device portion 504 connected in a second orientation with display 504 facing away from keyboard 508. The described technologies can determine the orientation in which first device portion 502 is connected to second device portion 506 and enable or disable functionality accordingly.

FIG. 6 illustrates a method 600 of detecting the orientation in which the portions of a multi-part device are connected and managing device functionality. In process block 602, a first voltage is received at a first input of a digital logic device and a second voltage is received at a second input of the digital logic device. The first voltage is determined by a voltage divider formed through connection of two portions of a hardware device. The second voltage is determined by connection of the two portions of the hardware device. The second voltage can be determined through a second voltage divider formed through connection of the two portions of the hardware device or can be, for example, ground or Vcc.

In process block 604, it is determined, using the digital logic device, which of the first voltage or the second voltage is greater. The first voltage and the second voltage are either both digital logic lows or digital logic highs, which allows pins of a connector of the hardware device to be used for both connection orientation detection and another function (e.g., determining that the device portions are connected) without interfering with the other function. Based on which of the first or second voltage is greater, it is determined in process block 606 whether the two portions of the hardware device are connected in a first orientation or a second orientation. In process block 608, functionality of the hardware device is enabled or disabled based on the determined orientation.

In some examples, the technology described with reference to FIGS. 1-8 is implemented in a computing device comprising a display portion and a base portion. The display portion includes a first connector portion and a first resistor on a first side of the display portion. The first resistor is connected between ground and a pin of the first connector portion. The display portion is detachably and reversibly connectable to the base portion. The base portion includes a second connector portion and second and third resistors. The second and third resistors have a same value that is greater than a value of the first resistor. The second resistor is in a first side of the base portion and is connected between a positive supply voltage and a first pin of the second connector portion. The third resistor is in a second side of the base portion and is connected between a positive supply voltage and a second pin of the second connector portion. Connection of the display portion to the base portion in a forward orientation forms a first voltage divider through connection of the pin of the first connector portion and the first pin of the second connector portion. Connection of the display portion to the base portion in a reverse orientation forms a second voltage divider through connection of the pin of the first connector portion and the second pin of the second connector portion.

The computing device also includes a digital logic device configured to receive a voltage representing the output of either the first or second voltage divider and compare the voltage to a second voltage. The result of the comparison indicates whether the display portion is connected to the base portion in the forward orientation or the reverse orientation. Both the output of the first or second voltage divider and the second voltage are within a low voltage range below a digital logic low threshold.

The digital logic device can comprise an analog-to-digital converter. The digital logic device is configured to compare digital voltage levels converted, using the analog-to-digital converter, from the output of the first or second voltage divider and the second voltage. The computing device can also include a fourth resistor having a value smaller than the value of the first resistor, the fourth resistor being in a second side of the display portion. In such examples, the second voltage is an output of a voltage divider between the fourth resistor and either the second or third resistor.

Both the base portion and the display portion can comprise at least one processing device. The display portion can be configured to operate independently of the base portion while the display portion is disconnected from the base portion. The at least one processing device of the display portion can be configured to communicate with the at least one processing device of the base portion when the display portion is connected to the base portion.

Example Computing Systems

Figure 7:
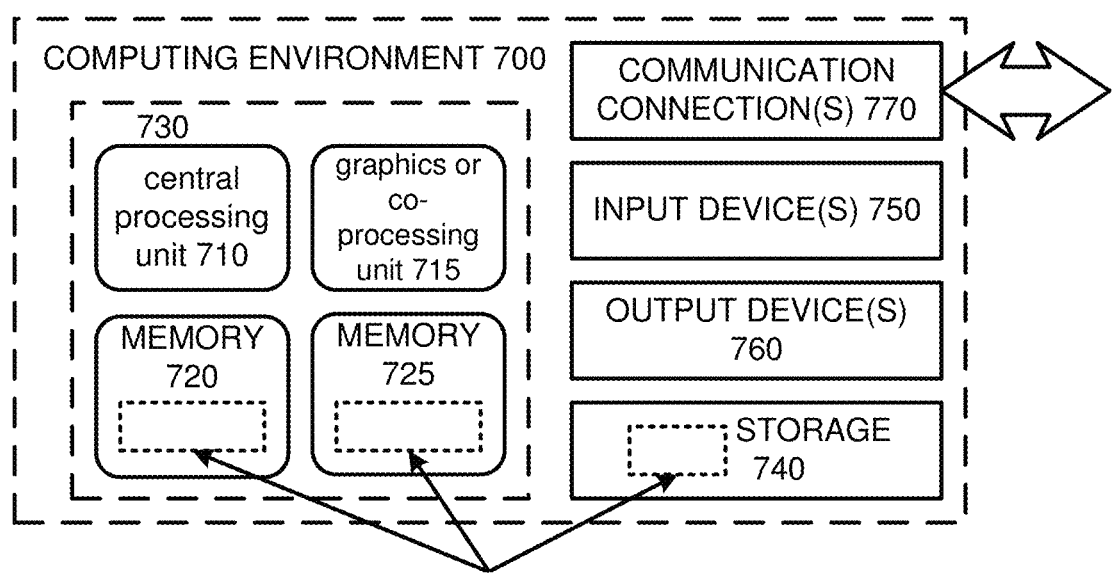
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720, 725 can store software configured to enable or disable functionality of a multi-part device based on a detected orientation.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store software configured to enable or disable functionality of a multi-part device based on a detected orientation.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 8:
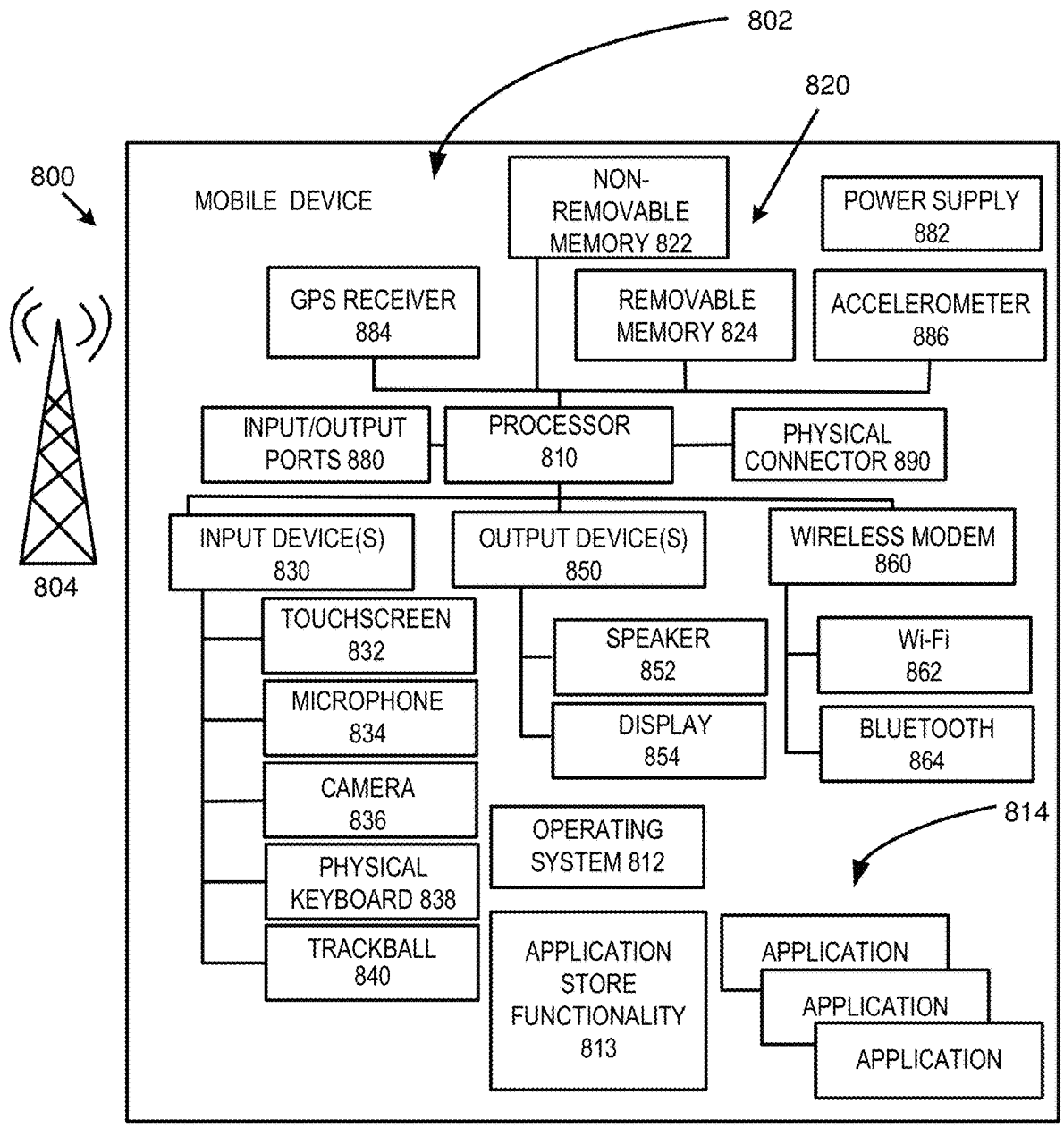
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. The application programs 814 can also include connection-orientation-dependent device functionality management technology. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725 and storage 740. By way of example and with reference to FIG. 8, computer-readable storage media include memory 820, 822, and 824. The term computer-readable storage media does not include signals and carrier waves. In addition, the term computer-readable storage media does not include communication connections (e.g., 770, 860, 862, and 864).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A device, comprising:
a first device portion;
a second device portion, wherein the first device portion is detachably and reversibly connectable to the second device portion;
a first resistor, the first resistor in a first side of the first device portion;
a second resistor and a third resistor, the second resistor in a first side of the second device portion and the third resistor in a second side of the second device portion, wherein connection of the first device portion to the second device portion in a first orientation forms a first voltage divider, the first voltage divider being between the first resistor and the second resistor, and wherein connection of the first device portion to the second device portion in a second orientation forms a second voltage divider, the second voltage divider being between the first resistor and the third resistor; and
a digital logic device configured to receive a voltage representing the output of either the first or second voltage divider and compare the voltage to a second voltage, wherein a result of the comparison indicates whether the device is connected in the first orientation or the second orientation, and wherein both the output of the first or second voltage divider and the second voltage are within either a low voltage range below a digital logic low threshold or a high voltage range above a digital logic high threshold.

2. The device of claim 1, wherein the second resistor and the third resistor have a same value.

3. The device of claim 1, wherein the digital logic device comprises an analog-to-digital converter, and wherein the digital logic device is configured to compare digital voltage levels converted, using the analog-to-digital converter, from the output of the first or second voltage divider and the second voltage.

4. The device of claim 1, wherein the digital logic device comprises a comparator.

5. The device of claim 1, further comprising a fourth resistor, the fourth resistor in a second side of the first device portion, wherein the second voltage is an output of a voltage divider between the fourth resistor and either the second or third resistor.

6. The device of claim 5, wherein the second and third resistors have a same value, and wherein the first and fourth resistors have different values.

7. The device of claim 1, wherein:
the first device portion comprises a first connector portion, the first resistor being conductively coupled to a pin of the first connector portion,
the second device portion comprises a second connector portion, the second and third resistors being conductively coupled, respectively, to different pins of the second connector portion, and
the first and second connector portions are connected when the first and second device portions are connected.

8. The device of claim 1, wherein the device is a laptop, and wherein at least one of the first or second device portion contains a display.

9. The device of claim 1, wherein at least one of the first or second device portion comprises at least one processing device in communication with the digital logic device, the at least one processing device configured to enable or disable functionality of the device based on the result of the comparison by the digital logic device.

10. The device of claim 9, wherein both of the first and second device portions comprises at least one processing device in communication with the digital logic device, the processing devices configured to enable or disable functionality of the device based on the result of the comparison by the digital logic device.

11. A method, comprising:
receiving a first voltage at a first input of a digital logic device and a second voltage at a second input of the digital logic device, the first voltage determined by a voltage divider formed through connection of two portions of a hardware device, and the second voltage determined by connection of the two portions of the hardware device;
determining, using the digital logic device, which of the first voltage or the second voltage is greater, wherein the first voltage and the second voltage are either both digital logic lows or digital logic highs;
based on which of the first or second voltage is greater, determining whether the two portions of the hardware device are connected in a first orientation or a second orientation; and
based on the determined orientation, enabling or disabling functionality of the hardware device.

12. The method of claim 11, wherein the second voltage is determined by a second voltage divider formed through connection of the two portions of the hardware device.

13. The method of claim 11, wherein the hardware device is a computing device having a display portion and a base portion, the base portion comprising a keyboard, and wherein the functionality of the hardware device enabled or disabled comprises at least one of keyboard functionality or display functionality.

14. The method of claim 11, further comprising determining that the two portions of the hardware device are connected based on the first voltage and the second voltage being both either digital logic highs or digital logic lows.

15. A computing device, comprising:
a display portion comprising:
a first connector portion; and
a first resistor on a first side of the display portion, the first resistor connected between ground and a pin of the first connector portion; and
a base portion, the display portion being detachably and reversibly connectable to the base portion, the base portion comprising:
a second connector portion;
a second resistor and a third resistor, the second and third resistors having a same value that is greater than a value of the first resistor, the second resistor in a first side of the base portion and connected between a positive supply voltage and a first pin of the second connector portion, the third resistor in a second side of the base portion and connected between a positive supply voltage and a second pin of the second connector portion, wherein connection of the display portion to the base portion in a forward orientation forms a first voltage divider through connection of the pin of the first connector portion and the first pin of the second connector portion, and wherein connection of the display portion to the base portion in a reverse orientation forms a second voltage divider through connection of the pin of the first connector portion and the second pin of the second connector portion; and
a digital logic device configured to receive a voltage representing the output of either the first or second voltage divider and compare the voltage to a second voltage, wherein a result of the comparison indicates whether the display portion is connected to the base portion in the forward orientation or the reverse orientation, and wherein both the output of the first or second voltage divider and the second voltage are within a low voltage range below a digital logic low threshold.

16. The computing device of claim 15, wherein the digital logic device comprises an analog-to-digital converter, and wherein the digital logic device is configured to compare digital voltage levels converted, using the analog-to-digital converter, from the output of the first or second voltage divider and the second voltage.

17. The computing device of claim 16, further comprising a fourth resistor having a value smaller than the value of the first resistor, the fourth resistor in a second side of the display portion, wherein the second voltage is an output of a voltage divider between the fourth resistor and either the second or third resistor.

18. The computing device of claim 15, wherein connection of the pin of the first connector portion to either the first or second pin of the second connector portion provides a digital low signal to a processing device of the base portion, and wherein the processing device determines that the display portion is connected to the base portion based at least in part on the digital low signal.

19. The computing device of claim 15, wherein the display portion comprises a display screen, wherein the base portion comprises a keyboard, wherein in the forward orientation, the display screen faces the keyboard, and wherein in the reverse orientation, the display screen faces away from the keyboard.

20. The computing device of claim 15, wherein both the base portion and the display portion comprise at least one processing device, wherein the display portion is configured to operate independently of the base portion while the display portion is disconnected from the base portion, and wherein the at least one processing device of the display portion is configured to communicate with the at least one processing device of the base portion when the display portion is connected to the base portion.

* * * * *